(12) United States Patent
Casey et al.

(10) Patent No.: US 10,767,134 B1
(45) Date of Patent: Sep. 8, 2020

(54) LESS CORROSIVE ORGANOMOLYBDENUM COMPOUNDS AS LUBRICANT ADDITIVES

(71) Applicant: VANDERBILT CHEMICALS, LLC, Norwalk, CT (US)

(72) Inventors: Brian M. Casey, Norwalk, CT (US); Vincent J. Gatto, Bradenton, FL (US)

(73) Assignee: VANDERBILT CHEMICALS, LLC, Norwalk, CT (US)

( * ) Notice: Subject to any disclaimer, the term of this patent is extended or adjusted under 35 U.S.C. 154(b) by 0 days.

(21) Appl. No.: 16/415,593

(22) Filed: May 17, 2019

(51) Int. Cl.
*C10M 139/00* (2006.01)
*C07F 11/00* (2006.01)
*C10M 159/12* (2006.01)
*C10N 30/06* (2006.01)
*C10N 30/12* (2006.01)
*C10N 40/25* (2006.01)

(52) U.S. Cl.
CPC ......... *C10M 139/00* (2013.01); *C07F 11/005* (2013.01); *C10M 159/12* (2013.01); *C10M 2227/09* (2013.01); *C10N 2030/06* (2013.01); *C10N 2030/12* (2013.01); *C10N 2040/252* (2020.05); *C10N 2040/255* (2020.05)

(58) Field of Classification Search
CPC .............. C10M 139/00; C10M 159/12; C10M 2227/09; C07F 11/005; C10N 2030/06; C10N 2040/252; C10N 2030/12; C10N 2040/255

See application file for complete search history.

(56) References Cited

U.S. PATENT DOCUMENTS

| | | | |
|---|---|---|---|
| 2,795,552 A | 6/1957 | Abbott et al. | |
| 2,992,994 A | 7/1961 | Albrecht et al. | |
| 3,216,940 A * | 11/1965 | Stewart | C08F 8/32 508/260 |
| 4,765,918 A | 8/1988 | Love et al. | |
| 6,528,463 B1 | 3/2003 | Gatto et al. | |
| 7,598,211 B2 * | 10/2009 | Karol | C10M 159/18 508/194 |
| 2015/0232779 A1 | 8/2015 | Fouts et al. | |
| 2017/0044456 A1 | 2/2017 | Patel et al. | |

FOREIGN PATENT DOCUMENTS

GB 796732 A 6/1959

OTHER PUBLICATIONS

Shigeharu Nagano, "Cosmetic from Human Placenta". Abstract of JP35012097, Aug. 27, 1960.

* cited by examiner

*Primary Examiner* — Taiwo Oladapo
(74) *Attorney, Agent, or Firm* — Norris McLaughlin, P.A.

(57) ABSTRACT

A molybdate ester represented by the following formula:

where $R^1$ is a hydrocarbon chain, $R^2$ is either a hydrogen atom or a hydrocarbon chain, and m and n are independently from 1 to 5, is effective when used in a lubricating composition in an amount sufficient to provide about 50-5000 ppm of molybdenum, with respect to friction and wear reduction, while providing improved protection against copper and lead corrosion.

9 Claims, No Drawings

LESS CORROSIVE ORGANOMOLYBDENUM COMPOUNDS AS LUBRICANT ADDITIVES

BACKGROUND OF THE INVENTION

Field of the Invention

This invention involves the development of less corrosive, high performing organomolybdenum compounds with applications as additives in lubricants. Lubricants containing these compounds have demonstrated improved performance with respect to friction reduction, wear protection, and copper and lead corrosion, in particular for diesel and passenger car engine oil applications where high performing, more durable additives are required in terms of oxidative and hydrolytic stability.

The class of compounds in the present invention may be represented by the following formula:

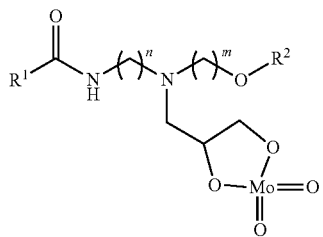

where $R^1$ is a hydrocarbon chain and $R^2$ is either a hydrogen atom or a hydrocarbon chain. The $R^1$ group consists of an unsaturated, and/or saturated, and/or branched hydrocarbon chain containing 1 to 21 carbon atoms. It is preferred that the $R^1$ group is unsaturated or branched. It is further preferred that the $R^1$ group is both saturated and branched. It is also preferred that the $R^1$ group consists of a hydrocarbon chain containing 11 to 21 carbon atoms. The $R^2$ group can be a hydrogen atom or a linear, cyclic, or branched hydrocarbon chain containing 1 to 20 carbon atoms. The number of methylene spacer groups (n and m) are each independently from 1 to 5. It is preferred that the number of methylene spacer groups (n and m) are each independently 2 or 3.

The preferred organomolybdenum compounds are prepared from the reaction of either N-[2-[(2,3-dihydroxypropyl) (2-hydroxyethyl)amino]-ethyl]oleamide or N-[2-[(2,3-dihydroxypropyl)(2-hydroxyethyl)amino]ethyl]isostearamide with a molybdenum source and are effective as lubricant additives in passenger car motor oils and heavy duty diesel engine oils to be used at treat rates in the range of 0.05-5.00 weight percent.

Discussion of the Prior Art

GB796732 describes the preparation of organomolybdenum compounds as the reaction product of an alpha- or beta-alkane diol and a molybdenum source and the application of these compounds as corrosion inhibitors and antioxidants in lubricating oil compositions primarily derived from mineral oils. The inventive class of compounds are chemically distinct and outside the class described in GB796732. Furthermore, GB796732 does not contemplate the described examples for their role in terms of improved frictional performance and/or wear protection.

US20170044456 describes a lubricating composition that is less corrosive towards copper and lead for use in heavy duty diesel formulations that allows for the use of organomolybdenum. The lubricating composition discussed in US20170044456 is a formulation solution to copper and lead corrosion involving the pairing a sulfur-free organomolybdenum, a sulfur-containing organomolybdenum, and a specific triazole-based corrosion inhibitor. The invention presented herein differs significantly in that the inventive examples represent additives that are inherently less aggressive towards copper and lead than comparative organic and/or organometallic additives.

Examples of the ligands used to prepare this class of compounds are contained within DE1061966 and JP35012097. However, neither DE1061966 nor JP35012097 describe any subsequent reactions of these ligands with any metals, including molybdenum. Furthermore, the preparations of neither unsaturated nor branched examples of N-[2-[(2,3-dihydroxy-propyl)(2-hydroxyethyl)amino]ethyl]-alkylamides are discussed, nor are the class of organomolybdenum compounds in the present invention based on ligands being N-[3-[(2,3-dihydroxypropyl) (3-alkoxypropyl)amino] propyl]-alkylamides. Furthermore, neither DE1061966 nor JP35012097 contemplate applications for examples related to the inventive class of compounds in lubricants as additives for friction modification or wear protection.

DE 1061966 describes preparation of 2,3-dihydroxy compounds related to the ligands of the present invention by reacting intermediate alkylamide, N-[2-[(2-hydroxyethyl)amino]ethyl]- with α-chlorohydrin or epichlorohydrin. This process can require the use of caustic bases and generates halogenated waste. In the invention presented herein, intermediate alkylamide amines were reacted instead with glycidol in the presence of ethanol. These reactions benefit from being completely atom economical and generate no waste. The ethanol can be separated from the reaction by simple distillation and recycled into the process.

SUMMARY OF THE INVENTION

Traditional organic friction modifiers, such as glycerol monooleate, are susceptible to both oxidation and hydrolysis when used as additives in engine oil applications. As a result, these additives and their degradation products can lead to erosions in performance and/or corrosion (i.e. copper and/or lead). The invention disclosed herein meets or surpasses the friction reduction of traditional additives while also providing significant improvements in copper and lead corrosion as determined by ASTM D6594, Standard Test Method for Evaluation of Corrosiveness of Diesel Engine Oil at 135° C. (HTCBT). Furthermore, organomolybdenum compounds are multifunctional lubricant additives providing improved antioxidancy, friction reduction, and wear protection performance.

Based on the results of the frictional performance, wear protection, and corrosion testing set forth below, the inventive examples have been demonstrated to represent a new class of additives capable of meeting or exceeding the frictional and wear performance of traditional additives while significantly reducing the severity of the observed copper and lead corrosion. This inventive class of compounds is particularly useful in both passenger car motor oil and heavy duty diesel engine oil applications where high performing, more durable friction modifier and/or anti-wear additives are required in terms of oxidative and hydrolytic stability.

The inventive class of compounds can be prepared via the following General Reaction Scheme:

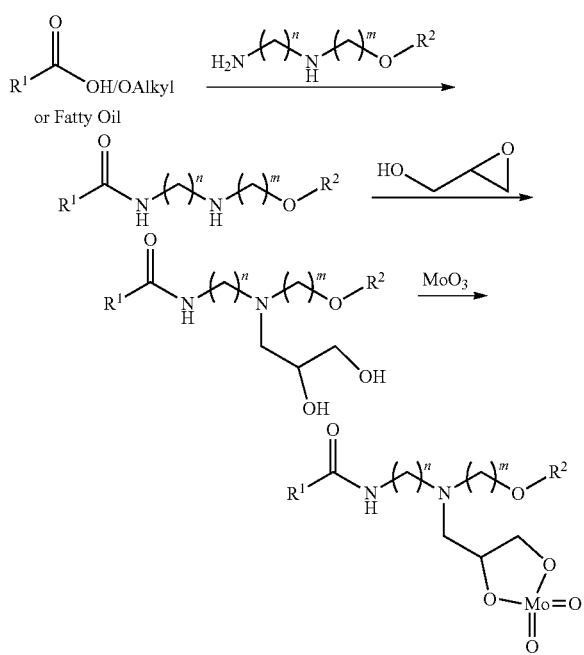

In the first step, a carbonyl-containing compound such as a carboxylic acid, carboxylic acid ester, or triglyceride is reacted with a mixed primary/secondary amine-containing compound to form a secondary amide. In the second step, the secondary amide intermediate is reacted further with glycidol to furnish a 2,3-dihydroxypropyl adduct. The second step can be performed in the presence of a protic solvent such as methanol or ethanol to improve the reaction efficiency. In the third step, the glycidol adduct is reacted with a molybdenum source such as molybdenum trioxide in the presence of water. The reaction mixture containing the molybdenum complex can be diluted with process oil resulting in the final organomolybdenum product.

As highlighted above, the class of compounds in this invention may also be described as the reaction products of an organic ligand and a molybdenum source performed in the presence of water. The organomolybdenum-containing product can be diluted with process oil. The relative ratios of the organic ligand, the molybdenum source, and the process oil can be varied such that the final organomolybdenum product contains between 0.5 and 15.0% molybdenum by weight. More preferably, the final organomolybdenum product contains between 2.0 and 10.0% molybdenum by weight. The organic ligand can be described as the reaction products of a carboxylic acid or ester or triglyceride, a mixed primary/secondary amine-containing compound, and glycidol. Non-limiting examples of the organic ligand used in the preparation of the organomolybdenum compounds of this invention include the following:

N-[2-[(2,3-dihydroxypropyl)(2-hydroxyethyl)amino]ethyl] lauramide
N-[2-[(2,3-dihydroxypropyl)(2-hydroxyethyl)amino]ethyl] myristamide
N-[2-[(2,3-dihydroxypropyl)(2-hydroxyethyl)amino]ethyl] palmitamide
N-[2-[(2,3-dihydroxypropyl)(2-hydroxyethyl)amino]ethyl] stearamide
N-[2-[(2,3-dihydroxypropyl)(2-hydroxyethyl)amino]ethyl] isostearamide
N-[2-[(2,3-dihydroxypropyl)(2-hydroxyethyl)amino]ethyl] myristoleamide
N-[2-[(2,3-dihydroxypropyl)(2-hydroxyethyl)amino]ethyl] palmitoleamide
N-[2-[(2,3-dihydroxypropyl)(2-hydroxyethyl)amino]ethyl] oleamide
N-[2-[(2,3-dihydroxypropyl)(2-hydroxyethyl)amino]ethyl] linoleamide
N-[3-[(2,3-dihydroxypropyl)(3-isotridecyloxypropyl) amino]propyl]lauramide
N-[3-[(2,3-dihydroxypropyl)(3-isotridecyloxypropyl) amino]propyl]myristamide
N-[3-[(2,3-dihydroxypropyl)(3-isotridecyloxypropyl) amino]propyl]palmitamide
N-[3-[(2,3-dihydroxypropyl)(3-isotridecyloxypropyl) amino]propyl]stearamide
N-[3-[(2,3-dihydroxypropyl)(3-isotridecyloxypropyl) amino]propyl]isostearamide
N-[3-[(2,3-dihydroxypropyl)(3-isotridecyloxypropyl) amino]propyl]myristoleamide
N-[3-[(2,3-dihydroxypropyl)(3-isotridecyloxypropyl) amino]propyl]palmitoleamide
N-[3-[(2,3-dihydroxypropyl)(3-isotridecyloxypropyl) amino]propyl]oleamide
N-[3-[(2,3-dihydroxypropyl)(3-isotridecyloxypropyl) amino]propyl]linoleamide
N-[3-[(2,3-dihydroxypropyl)(3-butyloxypropyl)amino]propyl]lauramide
N-[3-[(2,3-dihydroxypropyl)(3-butyloxypropyl)amino]propyl]myristamide
N-[3-[(2,3-dihydroxypropyl)(3-butyloxypropyl)amino]propyl]palmitamide
N-[3-[(2,3-dihydroxypropyl)(3-butyloxypropyl)amino]propyl]stearamide
N-[3-[(2,3-dihydroxypropyl)(3-butyloxypropyl)amino]propyl]isostearamide
N-[3-[(2,3-dihydroxypropyl)(3-butyloxypropyl)amino]propyl]myristoleamide
N-[3-[(2,3-dihydroxypropyl)(3-butyloxypropyl)amino]propyl]palmitoleamide
N-[3-[(2,3-dihydroxypropyl)(3-butyloxypropyl)amino]propyl]oleamide
N-[3-[(2,3-dihydroxypropyl)(3-butyloxypropyl)amino]propyl]linoleamide
N-[3-[(2,3-dihydroxypropyl)(3-octyloxypropyl)amino]propyl]lauramide
N-[3-[(2,3-dihydroxypropyl)(3-octyloxypropyl)amino]propyl]myristamide
N-[3-[(2,3-dihydroxypropyl)(3-octyloxypropyl)amino]propyl]palmitamide
N-[3-[(2,3-dihydroxypropyl)(3-octyloxypropyl)amino]propyl]stearamide
N-[3-[(2,3-dihydroxypropyl)(3-octyloxypropyl)amino]propyl]isostearamide
N-[3-[(2,3-dihydroxypropyl)(3-octyloxypropyl)amino]propyl]myristoleamide
N-[3-[(2,3-dihydroxypropyl)(3-octyloxypropyl)amino]propyl]palmitoleamide
N-[3-[(2,3-dihydroxypropyl)(3-octyloxypropyl)amino]propyl]oleamide
N-[3-[(2,3-dihydroxypropyl)(3-octyloxypropyl)amino]propyl]linoleamide
N-[3-[(2,3-dihydroxypropyl)(3-decyloxypropyl)amino]propyl]lauramide
N-[3-[(2,3-dihydroxypropyl)(3-decyloxypropyl)amino]propyl]myristamide N-[3-[(2,3-dihydroxypropyl)(3-decyloxypropyl)amino]propyl]palmitamide
N-[3-[(2,3-dihydroxypropyl)(3-decyloxypropyl)amino]propyl]stearamide
N-[3-[(2,3-dihydroxypropyl)(3-decyloxypropyl)amino]propyl]isostearamide
N-[3-[(2,3-dihydroxypropyl)(3-decyloxypropyl)amino]propyl]myristoleamide
N-[3-[(2,3-dihydroxypropyl)(3-decyloxypropyl)amino]propyl]palmitoleamide
N-[3-[(2,3-dihydroxypropyl)(3-decyloxypropyl)amino]propyl]oleamide
N-[3-[(2,3-dihydroxypropyl)(3-decyloxypropyl)amino]propyl]linoleamide
N-[2-[(2,3-dihydroxypropyl)(3-decyloxypropyl)amino]ethyl]oleamide
N-[3-[(2,3-dihydroxypropyl)(2-decyloxyethyl)amino]propyl]oleamide
N-[2-[(2,3-dihydroxypropyl)(3-hydroxypropyl)amino]ethyl]oleamide
N-[3-[(2,3-dihydroxypropyl)(2-hydroxyethyl)amino]propyl]oleamide
N-[2-[(2,3-dihydroxypropyl)(3-decyloxypropyl)amino]ethyl]isostearamide
N-[3-[(2,3-dihydroxypropyl)(2-decyloxyethyl)amino]propyl]isostearamide
N-[2-[(2,3-dihydroxypropyl)(3-hydroxypropyl)amino]ethyl]isostearamide
N-[3-[(2,3-dihydroxypropyl)(2-hydroxyethyl)amino]propyl]isostearamide

DETAILED DESCRIPTION OF THE INVENTION

The following three-step procedure is a general, representative example for the preparation of the class of compounds described in the present invention: 664 mmol of oleic acid is added to a 3-neck flask fitted with a temperature probe, mechanical stirrer, and distillation trap fitted with a condenser. To the flask is added 664 mmol of 2-aminoethylethanolamine and the reaction is placed under a nitrogen atmosphere. The reaction is heated to 150° C. and the generated water is collected in the distillation trap. After heating for approximately 6 hrs, the reaction is cooled and the product amide is used directly in the next step without purification.

271 mmol of the product from the previous step is added to a 3-neck flask fitted with a temperature probe and mechanical stirrer. 275 mL of ethanol is added to the flask and a reflux condenser is attached. A solution consisting of 258 mmol of glycidol in 70 mL of ethanol is prepared and transferred to an addition funnel with a nitrogen inlet attached atop the reflux condenser. The reaction is placed under nitrogen atmosphere and heated to reflux (approximately 80° C.). The solution of glycidol is added dropwise to the flask over 30 min. After the addition is complete, the reaction is refluxed for an additional 6 hrs. The reaction is concentrated via rotary evaporation until all of the ethanol is removed to yield the 2,3-dihydroxypropyl adduct.

The product from the previous step is added to a 3-neck flask fitted with a temperature probe and mechanical stirrer. Water is added and the reaction is placed under an atmosphere of nitrogen and heated to 100° C. Molybdenum trioxide is added and the reaction is heated until all of the molybdenum is digested. A small amount of an antifoaming agent is added and the reaction is heated to 135° C. under vacuum to remove water. Process oil is then added to the reaction mixture which is stirred briefly before hot-filtering through a pad of diatomaceous earth to yield the final organomolybdenum product.

In carrying out the above reactions, a variety of starting materials may be used as depicted in General Reaction Scheme I. In the first step, a carbonyl-containing compound such as a carboxylic acid, carboxylic acid ester, or triglyceride is used. For carboxylic acids, the $R^1$ group consisting of 1 to 21 carbon atoms can be a linear, cyclic, or branched saturated hydrocarbon or an unsaturated and/or polyunsaturated hydrocarbon or mixtures thereof. For carboxylic acid esters, the $R^1$ group consisting of 1 to 21 carbon atoms can be a linear, cyclic, or branched saturated hydrocarbon or an unsaturated and/or polyunsaturated hydrocarbon or mixtures thereof. For triglycerides, the $R^1$ group consisting of 1 to 21 carbon atoms can be a linear, cyclic, or branched saturated hydrocarbon or an unsaturated and/or polyunsaturated hydrocarbon or mixtures thereof. For the reaction of a carboxylic acid or carboxylic acid ester with the primary amine-containing compound, the reaction stoichiometry is typically 1.0 mole of carboxylic acid or carboxylic acid ester to 1.0 mole of the primary amine-containing compound to produce the desired secondary amide. Slight excesses of the carboxylic acid or carboxylic acid ester, or the primary amine-containing compound may be used but are generally not necessary nor preferred. Preferred carboxylic acid esters are fatty acid methyl esters (FAME's) and fatty acid ethyl esters, also referred to as biodiesel. Sources of biodiesel are the fatty oils described below. For the reaction of a triglyceride with the primary amine-containing compound, the reaction stoichiometry can be varied such that 1.0 mole of triglyceride is reacted with 1.0 to 3.0 mole of the primary amine-containing compound to produce the desired secondary amide and/or a mixture of the desired secondary amide with the corresponding mono- and dialkylglycerates. The carbon chains in the above examples of carbonyl-containing compounds can be derived from fatty oils such as coconut oil, hydrogenated coconut oil, fish oil, hydrogenated fish oil, tallow, hydrogenated tallow, corn oil, rapeseed oil, cottonseed oil, olive oil, palm oil, peanut oil, safflower oil, sesame oil, sunflower oil, canola oil, and soy bean oil. For the mixed primary/secondary amine-containing compound, the $R^2$ group can be a hydrogen atom or a linear, cyclic, or branched hydrocarbon chain containing 1 to 20 carbon atoms or mixtures thereof and the number of methylene spacer groups (n and m) can each vary independently from 1 to 5. In the final step, the molybdenum source can be molybdenum trioxide, molybdic acid, or a molybdate salt (for example, ammonium molybdate, ammonium heptamolybdate tetrahydrate, or sodium molybdate). It is preferred that the molybdenum source is molybdenum trioxide.

The following examples were prepared using the representative procedure provided above:

Example 1 (Ex. 1)

The preparative procedure for the organic ligand, N-[2-[(2,3-dihydroxypropyl)(2-hydroxyethyl)amino]-ethyl]oleamide, was identical to the first two steps of the representative procedure. In the final step, 79 mmol of the organic ligand was reacted with 54 mmol of water and 9 mmol of molybdenum trioxide as described in the representative procedure. Process oil (3.1 g) was added to generate an organomolybdenum product containing 2.2% molybdenum.

Example 2 (Ex. 2)

The preparative procedure for the organic ligand, N-[2-[(2,3-dihydroxypropyl)(2-hydroxyethyl)amino]-ethyl]oleamide, was identical to the first two steps of the representative procedure. In the final step, 79 mmol of the organic ligand was reacted at 105° C. with 27 mmol of water and 18 mmol of molybdenum trioxide as described in the representative procedure. Process oil (3.1 g) was added to generate an organomolybdenum product containing 4.2% molybdenum.

Example 3 (Ex. 3)

The preparative procedure for the organic ligand, N-[2-[(2,3-dihydroxypropyl)(2-hydroxyethyl)amino]-ethyl]oleamide, was identical to the first two steps of the representative procedure. In the final step, 79 mmol of the organic ligand was reacted at 105° C. with 27 mmol of water and 27 mmol of molybdenum trioxide as described in the representative procedure. Process oil (3.1 g) was added to generate an organomolybdenum product containing 6.1% molybdenum.

Example 4 (Ex. 4)

The preparative procedure for the organic ligand, N-[2-[(2,3-dihydroxypropyl)(2-hydroxyethyl)amino]-ethyl]oleamide, was identical to the first two steps of the representative procedure. In the final step, 79 mmol of the organic ligand was reacted at 110° C. with 13 mmol of water and 36 mmol of molybdenum trioxide as described in the representative procedure. Ex. 5 was not filtered through a pad of diatomaceous earth. Process oil (3.1 g) was added to generate an organomolybdenum product containing 8.2% molybdenum. This material was an extremely viscous, tar-like material and was not evaluated in subsequent performance studies.

Example 5 (Ex. 5)

The preparative procedure for the organic ligand, N-[2-[(2,3-dihydroxypropyl)(2-hydroxyethyl)amino]ethyl]oleamide, was identical to the first two steps of the representative procedure. In the final step, 68 mmol of the organic ligand was reacted at 110° C. with 12 mmol of water and 39 mmol of molybdenum trioxide as described in the representative procedure. Ex. 6 was not filtered through a pad of diatomaceous earth. Process oil (2.6 g) was added to generate an unfiltered organomolybdenum product containing 9.8% molybdenum. This material was an extremely viscous, tar-like material and was not evaluated in subsequent performance studies.

Example 6 (Ex. 6)

The preparative procedure for the organic ligand, N-[3-[(2,3-dihydroxypropyl)(3-isotridecyloxypropyl)amino]propyl]oleamide, was identical to the first two steps of the representative procedure except that isotridecyloxypropyl-1,3-diaminopropane was used in place of 2-aminoethylethanolamine. In the final step, 52 mmol of the organic ligand was reacted with 54 mmol of water and 9 mmol of molybdenum trioxide as described in the representative procedure. Process oil (3.1 g) was added to generate an organomolybdenum product containing 2.0% molybdenum.

Example 7 (Ex. 7)

The preparative procedure for the organic ligand, N-[2-[(2,3-dihydroxypropyl)(2-hydroxyethyl)amino]ethyl]cocoamide, was identical to the first two steps of the representative procedure except that coconut oil methyl esters were used in place of oleic acid and methanol was collected in the distillation trap. In the final step, 94 mmol of the organic ligand was reacted with 54 mmol of water and 9 mmol of molybdenum trioxide as described in the representative procedure. Process oil (3.1 g) was added to generate an organomolybdenum product containing 2.2% molybdenum.

Example 8 (Ex. 8)

The preparative procedure for the organic ligand, N-[3-[(2,3-dihydroxypropyl)(3-isotridecyloxy-propyl)amino]propyl]cocoamide, was identical to the first two steps of the representative procedure except that that coconut oil methyl esters were used in place of oleic acid, isotridecyloxypropyl-1,3-diaminopropane was used in place of 2-aminoethylethanolamine, and methanol was collected in the distillation trap. In the final step, 59 mmol of the organic ligand was reacted with 54 mmol of water and 9 mmol of molybdenum trioxide as described in the representative procedure. Process oil (3.1 g) was added to generate an organomolybdenum product containing 2.2% molybdenum.

Example 9 (Ex. 9)

The preparative procedure for the organic ligand, N-[2-[(2,3-dihydroxypropyl)(2-hydroxyethyl)-amino]ethyl] isostearamide, was identical to the first two steps of the representative procedure except that isostearic acid was used in place of oleic acid. In the final step, 76 mmol of the organic ligand was reacted at 105° C. with 27 mmol of water and 27 mmol of molybdenum trioxide as described in the representative procedure. Process oil (3.1 g) was added to generate an organomolybdenum product containing 6.3% molybdenum.

The following compounds are included as comparative examples to the invention disclosed herein:

Comparative Example 1 (CEx. 1)

Glycerol monooleate (HiTEC® 7133 from Afton Chemical)

Comparative Example 2 (CEx. 2)

A comparative organomolybdenum compound containing 2.3% molybdenum was prepared as described in U.S. Pat. No. 4,889,647.

Individual compounds from the inventive class of molecules can be used as additives in lubricants for friction reduction and/or supplemental wear protection at a treat rate from 0.01-5.00 wt. % of the additive as part of a total lubricating composition, preferably about 0.08-3.00%, more preferably about 0.08-2.00%, still more preferably about 0.10-1.00%; or about 50 ppm to 5000 ppm, preferably about 50-1000 ppm, and more preferably about 60-900 ppm, based on the amount of molybdenum in the additive delivered to the lubricant. Furthermore, these compounds can be used in combination with other additives such as dispersants, detergents, viscosity modifiers, antioxidants, other friction modifiers, anti-wear agents, corrosion inhibitors, rust inhibitors, salts of fatty acids (soaps), and extreme pressure additives.

Dispersants that may be used include polyisobutylene mono-succinimide dispersants, polyisobutylene di-succinimide dispersants, polypropylene mono-succinimide dispersants, polypropylene di-succinimide dispersants, ethylene/ propylene copolymer mono-succinimide dispersants, ethylene/propylene copolymer di-succinimide dispersants, Mannich dispersants, dispersant antioxidant olefin copolymers, low molecular weight ethylene propylene succimimide dispersants, carboxylic dispersants, amine dispersants, boronated dispersants, and molybdenum containing dispersants.

Detergents that may be used include neutral calcium sulfonate detergents, neutral magnesium sulfonate detergents, overbased calcium sulfonate detergents, overbased magnesium sulfonate detergents, neutral calcium phenate detergents, neutral magnesium phenate detergents, overbased calcium phenate detergents, overbased magnesium phenate detergents, neutral calcium salicylate detergents, neutral magnesium salicylate detergents, overbased calcium salicylate detergents, overbased magnesium salicylate detergents, sodium sulfonate detergents, and lithium sulfonate detergents Any type of polymeric viscosity index modifier may be used. Examples include polymers based on olefin copolymers (OCPs), polyalkylmethacrylates (PAMAs), polyisobutylenes (PIBs), styrene block polymers (such as styrene isoprene, styrene butadiene), and ethylene alpha-olefin copolymers.

Additional molybdenum-based friction modifiers may be used to supplement or enhance the overall performance of the class of compounds in this invention. Examples of the types of alternative friction modifiers that may be used include mononuclear molybdenum dithiocarbamates, dinuclear molybdenum dithiocarbamates, trinuclear molybdenum dithiocarbamates, sulfurized oxymolybdenum dithiocarbamates, sulfur- and molybdenum-containing compounds, molybdenum phosphorodithioates, sulfurized oxymolybdenum dithiophosphates, tetraalkylammonium thiomolybdates, molybdenum xanthates, molybdenum thioxanthates, imidazolium oxythiomolybdate salts, and quaternary ammonium oxythiomolybdate salts. Typical treat rates for molybdenum-based friction modifiers range from 50 ppm to 800 ppm of delivered molybdenum to the finished lubricant formulation.

It is preferred that additives such as glycerol monooleate and organic friction modifiers derived from fatty oils and diethanolamine are not present because, as will be demonstrated, these types of organic friction modifiers are highly corrosive to copper and lead as determined by the high temperature corrosion bench test (HTCBT, ASTM D6594).

Preferred anti-wear additives that may be used include primary and/or secondary zinc dialkyldithiophosphate (ZDDP), triphenylphosphorothioates, dialkylphosphoric acid amine salts, monoalkylphosphoric acid amine salts, dialkyldithiophosphate succinates, dithiophosphoric ester or carboxylic acids, trialkylborate esters, borate esters of fatty acid derivatives, and methylenebis(dibutyldithiocarbamate).

Preferred antioxidants that may be used include dinonyldiphenylamine, monononyldiphenylamine, dioctyldiphenylamine, monooctyldiphenylamine, butyloctyldiphenylamine, monobutyldiphenylamine, dibutyldiphenylamine, nonylated phenyl-alpha-naphthylamine octylated phenyl-alpha-naphthylamine, dodecylated phenyl-alpha-naphthylamine, 2,6-di-tert-butylphenol, butylated hydroxytoluene, 4,4-methylenebis(2,6-di-tert-butylphenol), octadecyl-3-[3,5-di-tert-butyl-4-hydroxyphenyl]propionate, isotridecyl-3-[3,5-di-tert-butyl-4-hydroxyphenyl]propionate, 2-ethylhexyl-3-[3,5-di-tert-butyl-4-hydroxyphenyl]propionate, isooctyl-3-[3,5-di-tert-butyl-4-hydroxyphenyl]propionate, and thiodiethylene bis [3-(3,5-di-tert-butyl-4-hydroxyphenyl)propionate].

Preferred corrosion and rust inhibitors that may be used include ethoxylated phenols, alkenylsuccinic acids, polyalkylene glycols, derivatives of benzotriazole, derivatives of tolutriazole, derivatives of triazole, dimercaptothiadiazole derivatives, fatty acid derivatives of 4,5-dihydro-1H-imidazole, neutral calcium dinonylnaphthalene sulfonates, neutral zinc dinonylnaphthalene sulfonates, and neutral alkaline earth sulfonates.

Preferred extreme pressure additives that may be used include sulfurized isobutylene, sulfurized alpha-olefins, aliphatic amine phosphates, aromatic amine phosphates, dimercaptothiadiazole derivatives, zinc dialkyldithiocarbamates, dialkylammonium dialkyldithiocarbamates, and antimony dialkyldithiocarbamates.

Treat levels for all the above-mentioned additives can vary significantly depending upon the application, additive solubility, base fluid type, and finished fluid performance requirements. Typical treat levels usually vary from 0.05 wt. % to 10.00 wt. % based on the type of finished lubricant being developed. Base fluids may include petroleum-based or synthetic stocks including any fluid that falls into the API base stock classification as Group I, Group II, Group III, Group IV, and Group V. Synthetic fluids include poly-α-olefins, polyols, esters, bio-based lubricants, and any combination of these. The lubricating base oil or fluid is present in at least 80% of the total lubricating composition.

Examples of the types of finished lubricants that may be developed using the additives of this invention include, gasoline engine oils, heavy duty diesel engine oils, natural gas engine oils, medium speed diesel (railroad and marine) engine oils, off-road engine oils, two-stroke and four-stroke motorcycle engine oils, hybrid vehicle engine oils, tractor oils, automotive racing oils, hydraulic fluids, automatic and manual transmission fluids, industrial and engine gear oils, and greases.

The results of performance evaluations for the inventive examples and the comparative examples are described in Examples 10-13. In Examples 10-12, inventive and comparative examples were blended into an SAE 0W-20 passenger car motor oil (0W-20 PCMO) at the treat rates indicated in Tables 1-6. This oil was fully formulated except that it excluded an organic or organometallic friction modifier (FM). In Example 13, inventive and comparative examples were blended into a commercial, CK-4 equivalent SAE 15W-40 heavy duty diesel engine oil (15W-40 HDDEO) at the treat rates indicated in Table 7.

Example 10

Tribological Performance Testing by SRV

The test method described for ASTM D5707 (Standard Test Method for Measuring Friction and Wear Properties of Lubricating Grease Using a High-Frequency, Linear-Oscillation (SRV) Test Machine) was followed to generate the performance data contained in Table 1. The results clearly demonstrate that the inventive examples all provide improved wear protection and frictional performance compared to the 0W-20 PCMO reference oil that does not contain an organic or organometallic friction modifier. Furthermore, all four inventive examples meet or surpass the frictional performance of CEx. 1, a traditional organic friction modifier, while providing better wear protection as evidenced by the wear volumes being between 9-27% lower for the inventive examples compared to CEx. 1. Furthermore, both inventive examples Ex. 1 and Ex. 7 provide lower friction on average than CEx. 2 with treat rates that deliver the same amount of molybdenum.

TABLE 1

Tribological Performance Testing by SRV (ASTM D5707)

| Additive | Treat Rate (wt. %) | Mo in oil (ppm) | Wear Volume ($\mu m^3$) | Average Coefficient of Friction |
|---|---|---|---|---|
| 0W-20 PCMO | 0 | 0 | 54,055 | 0.144 |
| + CEx. 1 | 0.80 | 0 | 41,699 | 0.132 |
| + CEx. 2 | 0.78 | 180 | 28,845 | 0.127 |
| + Ex. 1 | 0.82 | 180 | 38,141 | 0.122 |
| + Ex. 6 | 0.90 | 180 | 31,347 | 0.133 |
| + Ex. 7 | 0.82 | 180 | 30,163 | 0.116 |
| + Ex. 8 | 0.82 | 180 | 31,351 | 0.131 |

Example 11

Tribological Performance Testing by Four-Ball Wear

The test method described for ASTM D4172 B (Standard Test Method for Wear Preventive Characteristics of Lubricating Fluid (Four-Ball Method)) was followed to generate the performance data contained in Table 2. From the results of the Four-Ball Method tests, all four inventive examples show a favorable reduction in the average coefficient of friction compared to the 0W-20 PCMO reference oil containing no friction modifier. In addition, all inventive examples meet or significantly improve upon the wear protection of the 0W-20 PCMO reference oil as indicated by the wear scar diameters. By this test method, inventive Ex. 8 provides equivalent friction and wear performance to both comparative examples.

TABLE 2

Tribological Performance Testing by 4-Ball Wear (ASTM D4172 B)

| Additive | Treat Rate (wt. %) | Mo in oil (ppm) | Wear Scar Diameter (mm) | Average Coefficient of Friction |
|---|---|---|---|---|
| 0W-20 PCMO | 0 | 0 | 0.45 | 0.099 |
| + CEx. 1 | 0.80 | 0 | 0.34 | 0.062 |
| + CEx. 2 | 0.78 | 180 | 0.35 | 0.066 |
| + Ex. 1 | 0.82 | 180 | 0.43 | 0.075 |
| + Ex. 6 | 0.90 | 180 | 0.34 | 0.075 |
| + Ex. 7 | 0.82 | 180 | 0.45 | 0.083 |
| + Ex. 8 | 0.82 | 180 | 0.35 | 0.063 |

Example 12

Tribological Performance Testing by Mini Traction Machine

Mini Traction Machine (MTM) was used to evaluate frictional characteristics of lubricants in boundary and mixed lubrication regime (Stribeck Curve) with "Ball on Disc" configuration. MTM consists of a rotating 52100 steel ball pressed against an independently rotating 52100 steel disc immersed in the lubricant. The operating conditions are set by independently controlling the rotational velocities of the shafts that drives the ball and the disc, in order to obtain a particular combination of rolling speed and slide to roll ratio, as well as by controlling the contact force and the oil bath temperature. The test method parameters used to generate the frictional performance data contained in Tables 3-6 from the Mini Traction Machine (MTM) are as follows: 35 N load (~1 GPa), 50% slide:roll ratio, speed run from 3000 mm/s to 10 mm/s, 52100 steel. For each formulation, three Stribeck curves were generated at 40° C., 60° C., 80° C., 100° C., 120° C., and 140° C. The average value from the three runs was reported at each temperature.

The data in Table 3 refer to the coefficients of friction for each oil in the boundary lubrication regime. From the data, all four inventive examples provide improved boundary lubrication at temperatures at or above 100° C. compared to the 0W-20 PCMO reference oil containing no organic or organometallic friction modifiers. In particular, inventive Ex. 1 provides an improvement in the boundary lubrication regime at temperatures as low at 80° C. In addition, inventive Ex. 1 either matches or modestly improves upon the frictional performance of the comparative examples at or above 100° C. Table 4 contains the results for the Stribeck Coefficients obtained for the oils at each temperature. For temperatures at or above 100° C., all inventive examples significantly improved the frictional performance of the oil compared to the 0W-20 PCMO reference oil. Similar to the frictional data in the boundary lubrication regime, the oil containing inventive Ex. 1 provided significantly lower Stribeck Coefficients than every other friction modifier additive evaluated at temperatures from 100-140° C. and its performance is second only to CEx. 2 at 80° C. These results indicate that inventive Ex. 1 not only improves the frictional performance in the boundary lubrication regime but also into the mixed and elastohydrodynamic regimes.

TABLE 3

Tribological Performance Testing by MTM

| Additive | Treat Rate (wt. %) | Mo in oil (ppm) | Boundary Coefficient of Friction* at Specified Temperature | | | | | |
|---|---|---|---|---|---|---|---|---|
| | | | 40° C. | 60° C. | 80° C. | 100° C. | 120° C. | 140° C. |
| 0W-20 PCMO | 0 | 0 | 0.076 | 0.094 | 0.113 | 0.128 | 0.127 | 0.128 |
| +CEx. 1 | 0.80 | 0 | 0.091 | 0.095 | 0.090 | 0.090 | 0.088 | 0.077 |
| +CEx. 2 | 0.78 | 180 | 0.084 | 0.098 | 0.097 | 0.092 | 0.086 | 0.086 |
| +Ex. 1 | 0.82 | 180 | 0.093 | 0.102 | 0.100 | 0.091 | 0.085 | 0.082 |
| +Ex. 6 | 0.90 | 180 | 0.101 | 0.108 | 0.105 | 0.100 | 0.096 | 0.089 |
| +Ex. 7 | 0.82 | 180 | 0.083 | 0.114 | 0.114 | 0.106 | 0.098 | 0.088 |
| +Ex. 8 | 0.82 | 180 | 0.108 | 0.119 | 0.114 | 0.105 | 0.098 | 0.091 |

*Reported coefficients are the average of three runs. Boundary coefficient is the coefficient of friction at a speed of 10 mm/s.

TABLE 4

Tribological Performance Testing by MTM

| Additive | Treat Rate (wt. %) | Mo in oil (ppm) | Stribeck Coefficient* at Specified Temperature | | | | | |
| --- | --- | --- | --- | --- | --- | --- | --- | --- |
| | | | 40° C. | 60° C. | 80° C. | 100° C. | 120° C. | 140° C. |
| 0W-20 PCMO | 0 | 0 | 0.135 | 0.141 | 0.167 | 0.219 | 0.268 | 0.278 |
| +CEx. 1 | 0.80 | 0 | 0.142 | 0.156 | 0.168 | 0.180 | 0.191 | 0.181 |
| +CEx. 2 | 0.78 | 180 | 0.135 | 0.142 | 0.157 | 0.172 | 0.183 | 0.190 |
| +Ex. 1 | 0.82 | 180 | 0.150 | 0.152 | 0.161 | 0.160 | 0.167 | 0.174 |
| +Ex. 6 | 0.90 | 180 | 0.155 | 0.162 | 0.174 | 0.186 | 0.200 | 0.208 |
| +Ex. 7 | 0.82 | 180 | 0.134 | 0.158 | 0.173 | 0.183 | 0.186 | 0.184 |
| +Ex. 8 | 0.82 | 180 | 0.163 | 0.173 | 0.188 | 0.198 | 0.206 | 0.208 |

*Stribeck coefficients are calculated by taking the integration of the Stribeck curve at each individual temperature.

The data in Table 5 refer to the coefficients of friction in the boundary lubrication regime for oils containing either inventive Ex. 3 or Ex. 9. For this study, the additive treat rates were varied to deliver between 60 and 900 ppm molybdenum to the finished fluid. From the data, both inventive examples provide improved boundary lubrication at temperatures at or above 80° C. compared to the 0W-20 PCMO reference oil containing no organic or organometallic friction modifiers. Modest improvements in the boundary coefficient of friction were observed for both inventive examples even at the lowest treat rate (60 ppm Mo). Significant reductions in boundary friction were obtained once the treat rate of molybdenum was between 200-600 ppm. Formulations containing inventive Ex. 3 demonstrated exceptional performance improvements particularly at the highest temperatures and treat rates. For example, formulations containing 750-900 ppm molybdenum had boundary friction coefficients roughly 50% lower than the reference oil without any friction modifier at an operating temperature of 140° C. Table 6 contains the results for the Stribeck Coefficients obtained for the oils at each temperature and treat rate. Again, the data indicated that formulations containing either inventive example at all treat rates provide lower friction at temperatures at or above 80° C. compared to the 0W-20 reference oil containing no friction modifier. In particular, inventive Ex. 3 consistently resulted in lower Stribeck Coefficients at all treat rates once the temperature was at or above 60° C. As with the boundary friction coefficients, significant improvements in friction as evidenced by lower Stribeck Coefficients were observed for formulations containing at least 450 ppm of molybdenum (overall treat rate of 0.74 wt. %). In addition, this overall treat rate is roughly equivalent to that used for the comparative organic friction modifier, CEx. 1 (see results for CEx. 1 at 0.80 wt. % in Table 4). Both formulations containing 450 ppm Mo from either Ex. 3 or Ex. 9 consistently outperformed CEx. 1 at every operating temperature evaluated. Furthermore, additional improvements were observed when the treat rate of molybdenum was increased. In particular at 120-140° C., the Stribeck Coefficient for the formulation containing 750 ppm Mo from inventive Ex. 3 was approximately 55% lower than the reference oil containing neither an organic nor an organometallic friction modifier. The data in Tables 5 and 6 again indicate that the inventive examples are effective friction modifiers across a wide range of treat rates and temperatures and under both boundary and mixed lubrication regimes.

TABLE 5

Tribological Performance Testing by MTM at Variable Treat Rates

| Additive | Treat Rate (wt. %) | Mo in oil (ppm) | Boundary Coefficient of Friction* at Specified Temperature | | | | | |
| --- | --- | --- | --- | --- | --- | --- | --- | --- |
| | | | 40° C. | 60° C. | 80° C. | 100° C. | 120° C. | 140° C. |
| 0W-20 PCMO | 0 | 0 | 0.076 | 0.094 | 0.113 | 0.128 | 0.127 | 0.128 |
| +Ex. 3 | 0.10 | 60 | 0.072 | 0.090 | 0.103 | 0.107 | 0.108 | 0.112 |
| +Ex. 3 | 0.33 | 200 | 0.072 | 0.089 | 0.097 | 0.100 | 0.093 | 0.094 |
| +Ex. 3 | 0.74 | 450 | 0.088 | 0.096 | 0.097 | 0.096 | 0.089 | 0.085 |
| +Ex. 3 | 0.98 | 600 | 0.098 | 0.100 | 0.098 | 0.091 | 0.077 | 0.072 |
| +Ex. 3 | 1.23 | 750 | 0.087 | 0.096 | 0.098 | 0.090 | 0.078 | 0.069 |
| +Ex. 3 | 1.48 | 900 | 0.092 | 0.105 | 0.098 | 0.088 | 0.075 | 0.063 |
| +Ex. 9 | 0.10 | 60 | 0.086 | 0.106 | 0.111 | 0.111 | 0.112 | 0.114 |
| +Ex. 9 | 0.32 | 200 | 0.086 | 0.100 | 0.103 | 0.100 | 0.096 | 0.104 |
| +Ex. 9 | 0.71 | 450 | 0.079 | 0.087 | 0.093 | 0.092 | 0.088 | 0.081 |
| +Ex. 9 | 0.95 | 600 | 0.090 | 0.105 | 0.106 | 0.099 | 0.092 | 0.085 |
| +Ex. 9 | 1.19 | 750 | 0.098 | 0.106 | 0.105 | 0.099 | 0.092 | 0.084 |
| +Ex. 9 | 1.43 | 900 | 0.084 | 0.094 | 0.100 | 0.096 | 0.090 | 0.083 |

*Reported coefficients are the average of three runs. Boundary coefficient is the coefficient of friction at a speed of 10 mm/s.

TABLE 6

Tribological Performance Testing by MTM at Variable Treat Rates

| Additive | Treat Rate (wt. %) | Mo in oil (ppm) | Stribeck Coefficient* at Specified Temperature | | | | | |
|---|---|---|---|---|---|---|---|---|
| | | | 40° C. | 60° C. | 80° C. | 100° C. | 120° C. | 140° C. |
| 0W-20 PCMO | 0 | 0 | 0.135 | 0.141 | 0.167 | 0.219 | 0.268 | 0.278 |
| +Ex. 3 | 0.10 | 60 | 0.127 | 0.134 | 0.153 | 0.176 | 0.218 | 0.257 |
| +Ex. 3 | 0.33 | 200 | 0.129 | 0.135 | 0.150 | 0.170 | 0.187 | 0.216 |
| +Ex. 3 | 0.74 | 450 | 0.135 | 0.136 | 0.137 | 0.143 | 0.148 | 0.154 |
| +Ex. 3 | 0.98 | 600 | 0.142 | 0.141 | 0.140 | 0.136 | 0.129 | 0.126 |
| +Ex. 3 | 1.23 | 750 | 0.134 | 0.132 | 0.132 | 0.127 | 0.121 | 0.119 |
| +Ex. 3 | 1.48 | 900 | 0.140 | 0.147 | 0.147 | 0.142 | 0.136 | 0.127 |
| +Ex. 9 | 0.10 | 60 | 0.137 | 0.150 | 0.170 | 0.200 | 0.239 | 0.260 |
| +Ex. 9 | 0.32 | 200 | 0.139 | 0.144 | 0.155 | 0.169 | 0.191 | 0.232 |
| +Ex. 9 | 0.71 | 450 | 0.131 | 0.128 | 0.132 | 0.137 | 0.146 | 0.152 |
| +Ex. 9 | 0.95 | 600 | 0.140 | 0.142 | 0.146 | 0.148 | 0.149 | 0.158 |
| +Ex. 9 | 1.19 | 750 | 0.149 | 0.152 | 0.156 | 0.168 | 0.176 | 0.175 |
| +Ex. 9 | 1.43 | 900 | 0.134 | 0.133 | 0.138 | 0.142 | 0.144 | 0.144 |

*Stribeck coefficients are calculated by taking the integration of the Stribeck curve at each individual temperature.

Example 13

Copper and Lead Corrosion Testing by High Temperature Corrosion Bench Test (HTCBT)

The test method described for ASTM D6594 (Standard Test Method for Evaluation of Corrosiveness of Diesel Engine Oil at 135° C.) was followed to generate the copper and lead corrosion data contained in Table 7. For API CK-4 category and equivalent oils, the limits for passing the HTCBT are 20 ppm maximum for copper, 120 ppm maximum for lead, and a 3 maximum copper rating. From the data presented in Table 7, it is clear that the inclusion of CEx. 1 as an organic friction modifier additive in the 15W-40 HDDEO results in a significant amount of both copper and lead corrosion. The formulation containing CEx. 1, which is a purely ester-based additive, fails for copper corrosion and severely fails for lead corrosion. Alternatively, CEx. 2 is an organomolybdenum additive with an organic component comprising of a mixture of both amide- and ester-based compounds. For CEx. 2, the oil now passes for copper corrosion at the lower treat rate of molybdenum. At the higher treat rate, CEx.2 provides an equivalent amount of total additive compared to CEx. 1. While CEx. 2 still results in a severe failure for both copper and lead corrosion, the observed lead values have been reduced over 60%. The inventive examples are organomolybdenum additives with an organic component comprised purely of amide-based ligands. When inventive Ex. 1 is compared to CEx. 2, Ex. 1 demonstrates significant reductions in both the copper and lead corrosion. Ex. 1 passes the HTCBT for copper at both low and high treat rates and passes for lead at the lower treat rate. Across both treat rates, inventive Ex. 1 represents approximately a 67% reduction in the lead corrosion compared to CEx. 2. Inventive Ex. 2 represents a two-fold increase in the molybdenum content in the additive compared to Ex. 1. The HTCBT results for Ex. 2 indicate solid passing values for copper and lead at both treat rates. These improvements were extended further with inventive Ex. 3, which represents a three-fold increase in the molybdenum content in the additive compared to Ex. 1. Again, the results from the HTCBT indicate a significant reduction in both the copper and lead corrosion values. At the higher treat rate of molybdenum, the lead results from Ex. 3 are over 90% lower than CEx. 2 and over 96% lower than CEx. 1. Finally, inventive Ex. 9 represents an organomolybdenum compound containing a fully saturated amide-based organic ligand. The results of the HTCBT for Ex. 9 demonstrate that this additive does not contribute at all to copper corrosion as evidenced by the equivalent copper values and rating compared to the reference oil. In addition, formulations containing Ex. 9 result in only very modest increases in the lead values at both treat rates. The results indicate that Ex. 9, and to a lesser extent Ex. 2 and 3, can be used at higher treat rates to deliver more molybdenum if desirable in terms of frictional or wear performance.

TABLE 7

Copper and Lead Corrosion Testing by HTCBT (ASTM D6594)

| Additive | Treat Rate (wt. %) | Mo in oil (ppm) | Cu (ppm)* | Cu Rating* | Pb (ppm)* |
|---|---|---|---|---|---|
| 15W-40 HDDEO | 0 | 0 | 6.0 | 1b | 7.5 |
| + CEx. 1 | 0.75 | 0 | 40.0 | 2e | 925.0 |
| + CEx. 2 | 0.43 | 100 | 15.5 | 1b/2c | 196.0 |
| | 0.87 | 200 | 104.0 | 2c | 365.5 |
| + Ex. 1 | 0.45 | 100 | 8.0 | 1b | 63.0 |
| | 0.91 | 200 | 12.0 | 1b | 125.5 |
| + Ex. 2 | 0.24 | 100 | 7.5 | 1b | 42.0 |
| | 0.49 | 200 | 10.5 | 1b | 85.0 |
| + Ex. 3 | 0.16 | 100 | 13.5 | 2e | 23.5 |
| | 0.33 | 200 | 6.0 | 1b | 33.5 |
| + Ex. 9 | 0.16 | 100 | 5.5 | 1b | 18.0 |
| | 0.32 | 200 | 6.5 | 1b | 33.0 |

*Copper and lead values are the average of at least two runs. If duplicate runs resulted in different copper ratings, both ratings are provided.

The results of the frictional performance, wear protection, and corrosion testing demonstrate that the inventive examples represent a new class of additives capable of meeting or exceeding the frictional and wear performance of traditional additives while significantly reducing the severity of the observed copper and lead corrosion.

What is claimed is:

1. A molybdate ester represented by the following formula:

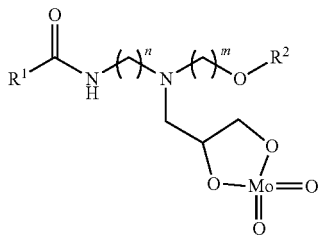

where $R^1$ is a hydrocarbon chain, $R^2$ is either a hydrogen atom or a hydrocarbon chain, and m and n are independently from 1 to 5.

2. The molybdate ester according to claim 1, being derived from one of the following compounds:
N-[2-[(2,3-dihydroxypropyl)(2-hydroxyethyl)amino] ethyl]alkaneamide
N-[2-[(2,3-dihydroxypropyl)(2-hydroxyethyl)amino] ethyl]isostearamide
N-[2-[(2,3-dihydroxypropyl)(2-hydroxyethyl)amino] ethyl]cocoamide
N-[2-[(2,3-dihydroxypropyl)(2-hydroxyethyl)amino] ethyl]oleamide
N-[3-[(2,3-dihydroxypropyl)(3-alkyloxypropyl)amino] propyl]alkaneamide
N-[3-[(2,3-dihydroxypropyl)(3-alkyloxypropyl)amino] propyl]isostearamide
N-[3-[(2,3-dihydroxypropyl)(3-alkyloxypropyl)amino] propyl]cocoamide
N-[3-[(2,3-dihydroxypropyl)(3-alkyloxypropyl)amino] propyl]oleamide.

3. A compound prepared by reacting
(a) a carboxylic acid or ester, with
(b) one of (i) 2-aminoethyl-ethanolamine, (ii) alkyloxypropyl-1,3-diaminopropane, (iii) alkyloxyethyl-1,3-diaminopropane, and (iv) alkyloxypropyl-1,2-diaminoethane; and
(c) glycidol;
(d) followed by reaction with a molybdenum source.

4. A lubricating composition comprising a major amount of lubricating base fluid and a molybdate ester represented by the following formula:

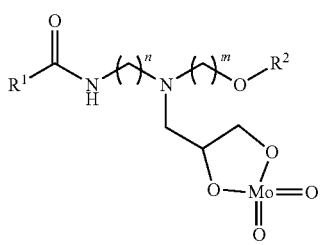

where $R^1$ is a hydrocarbon chain, $R^2$ is either a hydrogen atom or a hydrocarbon chain, and m and n are independently from 1 to 5, the molybdate ester being present in an amount sufficient to provide about 50-5000 ppm molybdenum in the lubricating composition.

5. The lubricating composition of claim 4, wherein the molybdate ester is present in an amount sufficient to provide about 50-1000 ppm molybdenum.

6. The lubricating composition comprising a major amount of lubricating base fluid and a compound prepared by reacting
(a) a carboxylic acid or ester, with
(b) one of (i) 2-aminoethyl-ethanolamine, (ii) alkyloxypropyl-1,3-diaminopropane, (iii) alkyloxyethyl-1,3-diaminopropane, and (iv) alkyloxypropyl-1,2-diaminoethane; and
(c) glycidol;
(d) followed by reaction with a molybdenum source.

7. The lubricating composition of claim 4, where the molybdate ester is derived from one of the following compounds:
N-[2-[(2,3-dihydroxypropyl)(2-hydroxyethyl)amino] ethyl]alkaneamide
N-[2-[(2,3-dihydroxypropyl)(2-hydroxyethyl)amino] ethyl]isostearamide
N-[2-[(2,3-dihydroxypropyl)(2-hydroxyethyl)amino] ethyl]cocoamide
N-[2-[(2,3-dihydroxypropyl)(2-hydroxyethyl)amino] ethyl]oleamide
N-[3-[(2,3-dihydroxypropyl)(3-alkyloxypropyl)amino] propyl]alkaneamide
N-[3-[(2,3-dihydroxypropyl)(3-alkyloxypropyl)amino] propyl]isostearamide
N-[3-[(2,3-dihydroxypropyl)(3-alkyloxypropyl)amino] propyl]cocoamide
N-[3-[(2,3-dihydroxypropyl)(3-alkyloxypropyl)amino] propyl]oleamide.

8. A method of manufacturing a molybdate ester, comprising the steps of, reacting
(a) a carboxylic acid or ester, with
(b) one of (i) 2-aminoethyl-ethanolamine, (ii) alkyloxypropyl-1,3-diaminopropane, (iii) alkyloxyethyl-1,3-diaminopropane, (iv) alkyloxypropyl-1,2-diaminoethane; and
(c) glycidol;
(d) followed by a reaction with a molybdenum source, wherein the molybdate ester is represented by the following formula:

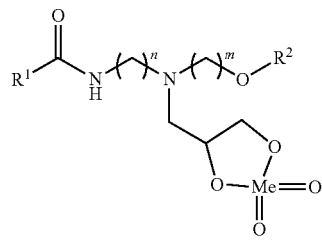

where $R^1$ is a hydrocarbon chain, $R^2$ is either a hydrogen atom or a hydrocarbon chain, and m and n are independently from 1 to 5.

9. The method of claim 8, wherein the molybdate ester is derived from one of the following compounds:
N-[2-[(2,3-dihydroxypropyl)(2-hydroxyethyl)amino] ethyl]alkaneamide
N-[2-[(2,3-dihydroxypropyl)(2-hydroxyethyl)amino] ethyl]isostearamide
N-[2-[(2,3-dihydroxypropyl)(2-hydroxyethyl)amino] ethyl]cocoamide N-[2-[(2,3-dihydroxypropyl)(2-hydroxyethyl)amino]ethyl]oleamide N-[3-[(2,3-dihydroxypropyl)(3-alkyloxypropyl)amino]propyl]alkaneamide N-[3-[(2,3-dihydroxypropyl)(3-alkyloxypropyl)amino]propyl]isostearamide N-[3-[(2,3-dihydroxypropyl)(3-alkyloxypropyl)amino]propyl]cocoamide N-[3-[(2,3-dihydroxypropyl)(3-alkyloxypropyl)amino]propyl]oleamide.

* * * * *